United States Patent
Lin

(10) Patent No.: US 12,463,774 B2
(45) Date of Patent: Nov. 4, 2025

(54) METHODS, ACCESS NETWORK NODE AND TERMINAL DEVICE FOR RANDOM ACCESS PROCEDURE

(71) Applicant: Telefonaktiebolaget LM Ericsson (publ), Stockholm (SE)

(72) Inventor: Zhipeng Lin, Nanjing Jiangsu (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 545 days.

(21) Appl. No.: 17/912,408

(22) PCT Filed: Mar. 11, 2021

(86) PCT No.: PCT/CN2021/080223
§ 371 (c)(1),
(2) Date: Sep. 16, 2022

(87) PCT Pub. No.: WO2021/185146
PCT Pub. Date: Sep. 23, 2021

(65) Prior Publication Data
US 2023/0209605 A1    Jun. 29, 2023

(30) Foreign Application Priority Data
Mar. 20, 2020 (WO) ................. PCT/CN2020/080434

(51) Int. Cl.
*H04W 74/0833* (2024.01)
*H04L 5/00* (2006.01)
*H04W 74/04* (2009.01)
*H04W 74/0836* (2024.01)
*H04W 74/0838* (2024.01)

(52) U.S. Cl.
CPC .......... *H04L 5/0051* (2013.01); *H04W 74/04* (2013.01); *H04W 74/0836* (2024.01); *H04W 74/0833* (2013.01); *H04W 74/0838* (2024.01)

(58) Field of Classification Search
None
See application file for complete search history.

(56) References Cited

U.S. PATENT DOCUMENTS

2019/0364599 A1* 11/2019 Islam ................ H04W 74/0833
2020/0008188 A1*  1/2020 Nam ...................... H04W 74/02
2020/0053779 A1*  2/2020 Jeon ..................... H04L 1/0026
(Continued)

FOREIGN PATENT DOCUMENTS

CN        110278612 A    9/2019

OTHER PUBLICATIONS

International Search Report and Written Opinion with Transmittal dated Jun. 2, 2021 in International Application No. PCT/CN2021/080223 (9 pages).
(Continued)

*Primary Examiner* — Faiyazkhan Ghafoerkhan
(74) *Attorney, Agent, or Firm* — Rothwell, Figg, Ernst & Manbeck, P.C.

(57) ABSTRACT

Methods, an access network node and a terminal device for random access procedure are disclosed. According to an embodiment, the access network node transmits a signaling message which configures a set of physical random access channel (PRACH) occasions (ROs) associated with channel state information reference signal (CSI-RS) for two-step random access procedure.

16 Claims, 10 Drawing Sheets

(56) References Cited

U.S. PATENT DOCUMENTS

| | | | |
|---|---|---|---|
| 2020/0236704 A1* | 7/2020 | Chande | H04W 74/0833 |
| 2023/0007702 A1* | 1/2023 | Park | H04W 74/0833 |
| 2023/0209605 A1* | 6/2023 | Lin | H04L 5/0053 |
| | | | 370/329 |

OTHER PUBLICATIONS

International Preliminary Report on Patentability with Transmittal dated Jul. 21, 2022 in International Application No. PCT/CN2021/080223 (5 pages).
CATT, "Discussion on PRACH coordination", 3GPP TSG-RAN WG3 Meeting #105-Bis, R3-195304, Chongqing, China, Oct. 14-18, 2019 (10 pages).
Samsung Electronics, "PRACH Occasion Selection for Msg1 based SI Request", 3GPP TSG-RAN2 103, R2-1811106, Gothenburg, Sweden, Aug. 20-24, 2018 (4 pages).
ZTE Corporation et al., "New work item: 2-step RACH for NR", 3GPP TSG RAN Meeting #82, RP-182894, Sorrento, Italy, Dec. 10-13, 2018 (5 pages).
Ericsson, "2-step RA 38.331 Running draft CR", Tdoc R2-2001217, 3GPP TSG-RAN WG2 #109 electronic, Athens, Greece, Feb. 24-Mar. 6, 2020, XP051848778 (20 pages).
Ericsson (e-mail disc rapporteur), "Phase 2 and 1 issue list", Tdoc R2-2001219, 3GPP TSG-RAN WG2 #109 electronic, Elbonia, Feb. 24-Mar. 6, 2020, XP051848780 (38 pages).
Ericsson, "Procedure for Two-step RACH", R1-1910907, 3GPP TSG-RAN WG1 Meeting #98, Chongqing, China, Oct. 14-18, 2019, XP051789685 (23 pages).

\* cited by examiner

METHODS, ACCESS NETWORK NODE AND TERMINAL DEVICE FOR RANDOM ACCESS PROCEDURE

CROSS REFERENCE TO RELATED APPLICATIONS

This application is a 35 U.S.C. § 371 National Stage of International Patent Application No. PCT/CN2021/080223, filed Mar. 11, 2021, which claims priority to International Patent Application No. PCT/CN2020/080434, filed Mar. 20, 2020. The above identified applications are incorporated by this reference.

TECHNICAL FIELD

Embodiments of the disclosure generally relate to wireless communication, and, more particularly, to methods, an access network node and a terminal device for random access procedure.

BACKGROUND

This section introduces aspects that may facilitate better understanding of the present disclosure. Accordingly, the statements of this section are to be read in this light and are not to be understood as admissions about what is in the prior art or what is not in the prior art.

In new radio (NR) system, a four-step approach as shown in FIG. 1 may be used for random access procedure. In this approach, the user equipment (UE) detects a synchronization signal (SS) and decodes the broadcasted system information (which may be distributed over multiple physical channels, e.g. physical broadcast channel (PBCH) and physical downlink shared channel (PDSCH)) to acquire random access transmission parameters, followed by transmitting a physical random access channel (PRACH) preamble (message 1 simply referred to as msg1) in the uplink. The next generation node B (gNB) detects the message 1 and replies with a random access response (RAR, message 2 simply referred to as msg2). The UE then transmits a UE identification (message 3 simply referred to as msg3) on physical uplink shared channel (PUSCH). Then the gNB transmits a contention resolution message (CRM, message 4 simply referred to as msg4) to the UE to solve conflict caused when multiple UEs transmit the same PRACH preamble.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide another solution for random access procedure.

According to a first aspect of the disclosure, there is provided a method performed by an access network node. The method comprises transmitting a signaling message which configures a set of physical random access channel (PRACH) occasions (ROs) associated with channel state information reference signal (CSI-RS) for two-step random access procedure.

In this way, two-step random access only operation is possible.

In an embodiment of the disclosure, the set of ROs associated with CSI-RS for two-step random access procedure may be from a set of common ROs configured for two-step random access procedure.

In an embodiment of the disclosure, the set of common ROs configured for two-step random access procedure may be shared with four-step random access procedure. The set of ROs associated with CSI-RS for two-step random access procedure may be from a set of common ROs configured for four-step random access procedure.

In an embodiment of the disclosure, the set of ROs associated with CSI-RS for two-step random access procedure may be configured by one or more of following parameters: PRACH configuration index for defining the set of common ROs for four-step random access procedure; a number of PRACH transmission occasions frequency division multiplexed in one time instance for defining the set of common ROs for four-step random access procedure; and an offset of the lowest PRACH transmission occasion in frequency domain with respective to physical resource block 0 (PRB 0) for defining the common set of ROs for four-step random access procedure.

In an embodiment of the disclosure, the PRACH configuration index may be provided in an information element (IE) "prach-ConfigurationIndex". The number of PRACH transmission occasions may be provided in an IE "msg1-FDM". The offset of the lowest PRACH transmission occasion may be provided in an IE "msg1-FrequencyStart".

In an embodiment of the disclosure, the set of common ROs configured for two-step random access procedure may be not shared with four-step random access procedure.

In an embodiment of the disclosure, the set of ROs associated with CSI-RS for two-step random access procedure may be configured by one or more of following parameters: PRACH configuration index for defining the set of common ROs for two-step random access procedure; a number of PRACH transmission occasions frequency division multiplexed in one time instance for defining the set of common ROs for two-step random access procedure; and an offset of the lowest PRACH transmission occasion in frequency domain with respective to PRB 0 for defining the common set of ROs for two-step random access procedure.

In an embodiment of the disclosure, the PRACH configuration index may be provided in an IE "msgA-PRACH-ConfigurationIndex". The number of PRACH transmission occasions may be provided in an IE "msgA-RO-FDM". The offset of the lowest PRACH transmission occasion may be provided in an IE "msgA-RO-FDM".

In an embodiment of the disclosure, the set of ROs associated with CSI-RS for two-step random access procedure may be a set of dedicated ROs separately configured for two-step random access procedure.

In an embodiment of the disclosure, the set of ROs associated with CSI-RS for two-step random access procedure may be from a set of ROs configured for four-step random access procedure. The set of ROs associated with CSI-RS for two-step random access procedure may be configured by the signaling message which explicitly configures the set of ROs for four-step random access procedure.

In an embodiment of the disclosure, the two-step random access procedure may be contention free random access (CFRA) procedure or may be used for beam failure recovery (BFR).

In an embodiment of the disclosure, the set of ROs associated with CSI-RS for two-step random access procedure may be from a set of dedicated ROs configured for two-step random access procedure.

In an embodiment of the disclosure, the set of dedicated ROs configured for two-step random access procedure may be associated with synchronization signal block (SSB).

In an embodiment of the disclosure, the two-step random access procedure may be CFRA procedure.

In an embodiment of the disclosure, the set of dedicated ROs configured for two-step random access procedure may be configured in an IE "RACH-ConfigDedicated".

In an embodiment of the disclosure, the set of dedicated ROs configured for two-step random access procedure may be configured by an IE "occasionsTwoStepRA" contained in an IE "CFRA-TwoStep".

According to a second aspect of the disclosure, there is provided a method performed by a terminal device. The method comprises receiving, from an access network node, a signaling message which configures a set of ROs associated with CSI-RS for two-step random access procedure. The method further comprises transmitting a request message for the two-step random access procedure, based on the set of ROs associated with CSI-RS.

In an embodiment of the disclosure, the set of ROs associated with CSI-RS for two-step random access procedure may be from a set of common ROs configured for two-step random access procedure.

In an embodiment of the disclosure, the set of common ROs configured for two-step random access procedure may be shared with four-step random access procedure. The set of ROs associated with CSI-RS for two-step random access procedure may be from a set of common ROs configured for four-step random access procedure.

In an embodiment of the disclosure, the set of ROs associated with CSI-RS for two-step random access procedure may be configured by one or more of following parameters: PRACH configuration index for defining the set of common ROs for four-step random access procedure; a number of PRACH transmission occasions frequency division multiplexed in one time instance for defining the set of common ROs for four-step random access procedure; and an offset of the lowest PRACH transmission occasion in frequency domain with respective to PRB 0 for defining the common set of ROs for four-step random access procedure.

In an embodiment of the disclosure, the PRACH configuration index may be provided in an IE "prach-ConfigurationIndex". The number of PRACH transmission occasions may be provided in an IE "msg1-FDM". The offset of the lowest PRACH transmission occasion may be provided in an IE "msg1-FrequencyStart".

In an embodiment of the disclosure, the set of common ROs configured for two-step random access procedure may be not shared with four-step random access procedure.

In an embodiment of the disclosure, the set of ROs associated with CSI-RS for two-step random access procedure may be configured by one or more of following parameters: PRACH configuration index for defining the set of common ROs for two-step random access procedure; a number of PRACH transmission occasions frequency division multiplexed in one time instance for defining the set of common ROs for two-step random access procedure; and an offset of the lowest PRACH transmission occasion in frequency domain with respective to PRB 0 for defining the common set of ROs for two-step random access procedure.

In an embodiment of the disclosure, the PRACH configuration index may be provided in an IE "msgA-PRACH-ConfigurationIndex". The number of PRACH transmission occasions may be provided in an IE "msgA-RO-FDM". The offset of the lowest PRACH transmission occasion may be provided in an IE "msgA-RO-FDM".

In an embodiment of the disclosure, the set of ROs associated with CSI-RS for two-step random access procedure may be a set of dedicated ROs separately configured for two-step random access procedure.

In an embodiment of the disclosure, the set of ROs associated with CSI-RS for two-step random access procedure may be from a set of ROs configured for four-step random access procedure. The set of ROs associated with CSI-RS for two-step random access procedure may be configured by the signaling message which explicitly configures the set of ROs for four-step random access procedure.

In an embodiment of the disclosure, the two-step random access procedure may be CFRA procedure or may be used for BFR.

In an embodiment of the disclosure, the set of ROs associated with CSI-RS for two-step random access procedure may be from a set of dedicated ROs configured for two-step random access procedure.

In an embodiment of the disclosure, the set of dedicated ROs configured for two-step random access procedure may be associated with SSB.

In an embodiment of the disclosure, the two-step random access procedure may be CFRA procedure.

In an embodiment of the disclosure, the set of dedicated ROs configured for two-step random access procedure may be configured in an IE "RACH-ConfigDedicated".

In an embodiment of the disclosure, the set of dedicated ROs configured for two-step random access procedure may be configured by an IE "occasionsTwoStepRA" contained in an IE "CFRA-TwoStep".

According to a third aspect of the disclosure, there is provided an access network node. The access network node comprises at least one processor and at least one memory. The at least one memory contains instructions executable by the at least one processor, whereby the access network node is operative to transmit a signaling message which configures a set of ROs associated with CSI-RS for two-step random access procedure.

In an embodiment of the disclosure, the access network node may be operative to perform the method according to the above first aspect.

According to a fourth aspect of the disclosure, there is provided a terminal device. The terminal device comprises at least one processor and at least one memory. The at least one memory contains instructions executable by the at least one processor, whereby the terminal device is operative to receive, from an access network node, a signaling message which configures a set of ROs associated with CSI-RS for two-step random access procedure. The terminal device is further operative to transmit a request message for the two-step random access procedure, based on the set of ROs associated with CSI-RS.

In an embodiment of the disclosure, the terminal device may be operative to perform the method according to the above second aspect.

According to a fifth aspect of the disclosure, there is provided a method implemented in a communication system including an access network node and at least one terminal device. The method comprises, at the access network node, transmitting a signaling message which configures a set of ROs associated with CSI-RS for two-step random access procedure. The method further comprises, at the at least one terminal device, receiving, from the access network node, the signaling message which configures the set of ROs associated with CSI-RS for two-step random access procedure. The method further comprises, at the at least one terminal device, transmitting a request message for the two-step random access procedure, based on the set of ROs associated with CSI-RS.

According to a sixth aspect of the disclosure, there is provided a communication system comprising an access network node and at least one terminal device. The access network node is configured to transmit a signaling message which configures a set of ROs associated with CSI-RS for two-step random access procedure. The at least one terminal device is configured to receive, from the access network node, the signaling message which configures the set of ROs associated with CSI-RS for two-step random access procedure, and transmit a request message for the two-step random access procedure, based on the set of ROs associated with CSI-RS.

According to a seventh aspect of the disclosure, there is provided a computer program product. The computer program product comprises instructions which when executed by at least one processor, cause the at least one processor to perform the method according to any of the above first and second aspects.

According to an eighth aspect of the disclosure, there is provided a computer readable storage medium. The computer readable storage medium comprises instructions which when executed by at least one processor, cause the at least one processor to perform the method according to any of the above first and second aspects.

According to a ninth aspect of the disclosure, there is provided an access network node. The access network node comprises a transmission module for transmitting a signaling message which configures a set of ROs associated with CSI-RS for two-step random access procedure.

According to a tenth aspect of the disclosure, there is provided a terminal device. The terminal device comprises a reception module for receiving, from an access network node, a signaling message which configures a set of ROs associated with CSI-RS for two-step random access procedure. The terminal device further comprises a transmission module for transmitting a request message for the two-step random access procedure, based on the set of ROs associated with CSI-RS.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

In the four-step random access procedure, the UE transmits PUSCH (message 3) after receiving a timing advance command in the RAR, allowing PUSCH to be received at the gNB with a timing accuracy within the cyclic prefix (CP). Without this timing advance functionality, a very large CP would be needed in order to be able to demodulate and detect PUSCH, unless the system is applied in a cell with very small distance between the UE and the gNB. Since NR will also support larger cells, there is a need for providing a timing advance to the UE and thus the four-step approach is needed for random access procedure.

For the transmission of msg1 preamble in 4-step random access channel (RACH), a set of common PRACH occasions (ROs) may be configured via PRACH-Configuration-Index, msg1-FrequencyStart and msg1-FDM in RACH-ConfigGeneric IE as defined below.

msg1-FDM:
    The number of PRACH transmission occasions frequency division multiplexed (FDMed) in one time instance (see technical specification (TS) 38.211, clause 6.3.3.2).

msg1-FrequencyStart:
    Offset of lowest PRACH transmission occasion in frequency domain with respective to physical resource block (PRB) 0. The value is configured so that the corresponding RACH resource is entirely within the bandwidth of the uplink (UL) bandwidth part (BWP) (see TS 38.211, clause 6.3.3.2).

prach-ConfigurationIndex:
    PRACH configuration index. For prach-ConfigurationIndex configured under beamFailureRecovery-Config, the prach-ConfigurationIndex can only correspond to the short preamble format (see TS 38.211, clause 6.3.3.2).

It can be realized that the terms "PRACH occasion", "random access channel (RACH) occasion" or "random access occasion" mentioned herein refers to a time-frequency resource usable for the preamble transmission in a RA procedure, which may also be referred to as "RA occasion". These terms may be used interchangeably in this document.

Figure 1:
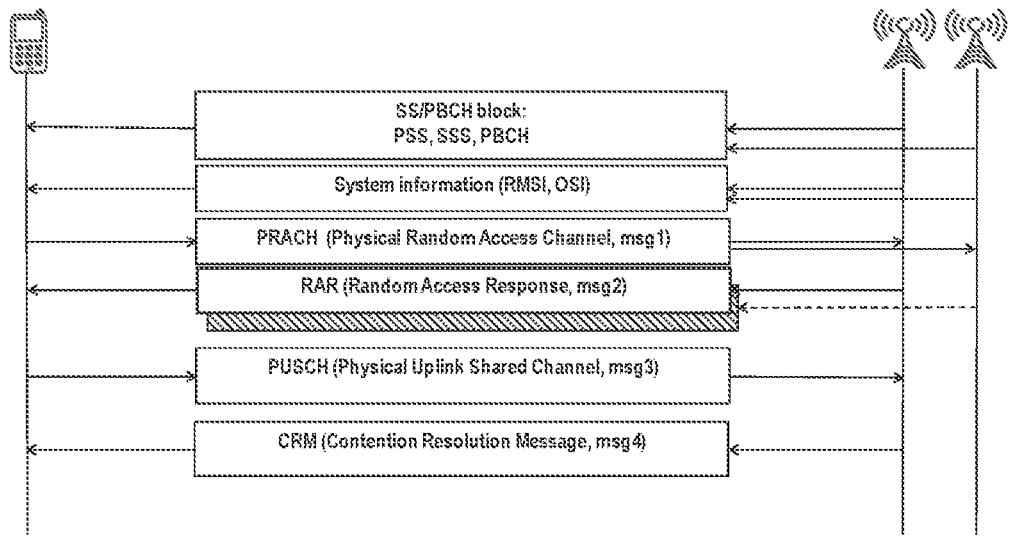
FIG. 1 is a diagram illustrating a four-step random access procedure in NR.
Figure 2:
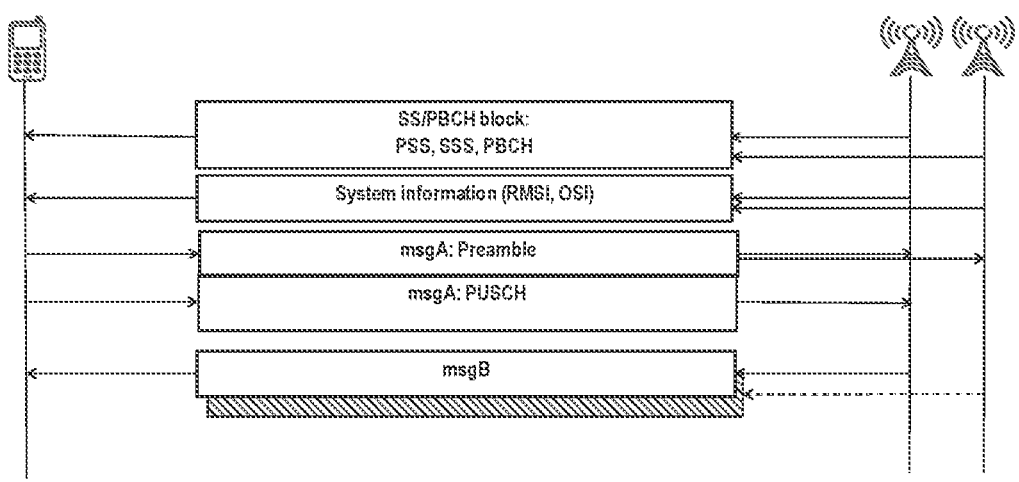
FIG. 2 is a diagram illustrating a two-step random access procedure in NR.

FIG. 2 illustrates a 2-step random access procedure. As illustrated in FIG. 2, in a 2-step random access procedure, the step of detecting synchronization signal (SS)/PBCH block and system information is the same as in the 4-step approach, but the initial access is completed in only two steps in order to minimize the number of channel accesses. At the first step, the UE sends a request message for random access (which may be denoted as message A, simply referred to as msgA) including random access preamble together with higher layer data such as radio resource control (RRC) connection request possibly with some additional payload on PUSCH. At the second step, the gNB sends a response message (which may be denoted as message B, simply referred to as msgB) including UE identifier assignment, timing advance information, and contention resolution message, etc.

Note that the 4-step random access procedure may also be called Type-1 random access procedure and the 2-step random access procedure may also be called Type-2 random access procedure. From the physical layer perspective, the Type-1 random access procedure includes the transmission of random access preamble (Msg1) in a PRACH, random access response (RAR) message with PDCCH/PDSCH (Msg2), and when applicable, the transmission of a PUSCH scheduled by a RAR UL grant, and PDSCH for contention resolution. From the physical layer perspective, the Type-2 random access procedure includes the transmission of random access preamble in a PRACH and of a PUSCH (MsgA) and the reception of a RAR message with a PDCCH/PDSCH (MsgB).

For the transmission of msgA preamble part in 2-step RACH, a set of common ROs may be separately configured via msgA-PRACH-ConfigurationIndex, msgA-RO-FrequencyStart and msgA-RO-FDM in RACH-ConfigGenericTwoStepRA IE as defined below.

msgA-PRACH-ConfigurationIndex:
Cell-specific PRACH configuration index for 2-step random access (RA) type. If the field is absent, the UE shall use the value of corresponding 4-step random access parameter in the configured BWP. If the value is in the range of 256 to 262, the field prach-Configura-tionIndex-v16xy should be considered configured (see TS 38.211, clause 6.3.3.2). This field may only be present if no 4-step type RA is configured in the BWP or in the case of separate ROs with 4-step type RA.

msgA-RO-FDM:
The number of msgA PRACH transmission occasions FDMed in one time instance. If the field is absent, UE shall use value of msg1-FDM in RACH-ConfigGeneric in the configured BWP (see TS 38.211, clause 6.3.3.2). This field may only be present if no 4-step type RA is configured in the BWP or in the case of separate ROs with 4-step type RA.

msgA-RO-FrequencyStart:
Offset of lowest PRACH transmissions occasion in frequency domain with respect to PRB 0. If the field is absent, UE shall use value of msg1-FrequencyStart in RACH-ConfigGeneric in the configured BWP (see TS 38.211, clauses 5.3.2 and 6.3.3.2). This field may only be present if no 4-step type RA is configured in the BWP or in the case of separate ROs with 4-step type RA.

Figure 3:
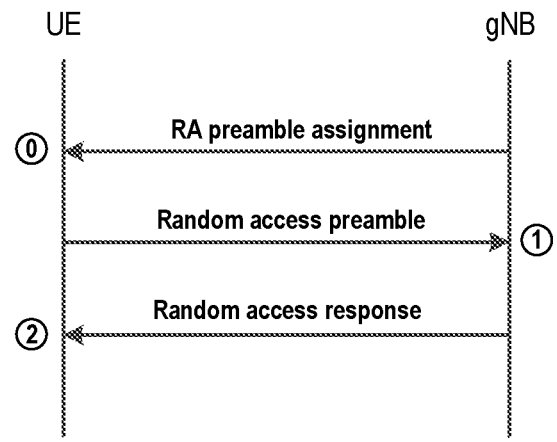
FIG. 3 is a flowchart illustrating CFRA with four-step random access type.
Figure 4:
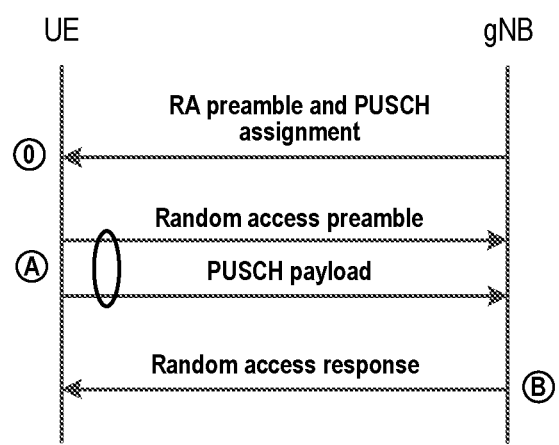
FIG. 4 is a flowchart illustrating CFRA with two-step random access type.

Both types of RA procedure (4-step RA type or Type-1 RA and 2-step RA type or Type-2 RA) support contention-based random access (CBRA) and contention-free random access (CFRA). FIG. 3 illustrates CFRA procedure with 4-step RA type. FIG. 4 illustrates CFRA procedure with 2-step RA type. As shown, the network assigns preamble for CFRA in 4-step RACH or preamble and PUSCH for CFRA in 2-step RACH. The network does not configure CFRA resources for 4-step and 2-step RA types at the same time for a BWP. CFRA with 2-step RA type is only supported for handover.

The msg1 of 4-step RA includes only a preamble on PRACH, while the msgA of 2-step RA type includes a preamble on PRACH and a payload on PUSCH. After msg1 transmission or msgA transmission, the UE monitors for a response from the network within a configured window. For CFRA, upon receiving the network response, the UE ends the random access procedure.

In higher layer ordered CFRA, as shown in below signaling, a set of dedicated ROs associated with SSB may be provided in occasionsTwoStepRA IE for CFRA. Besides the association with SSB, the preambles may be also associated with CSI-RS for which a list of ROs ra-OccasionList are also provided in the CSI-RS resource list csirs-ResourceList, as shown in below signaling.

```
RACH-ConfigDedicated ::=            SEQUENCE {
    cfra                                CFRA
OPTIONAL,    -- Need S
    ra-Prioritization                   RA-Prioritization
OPTIONAL,    -- Need N
    ...,
    [[
    ra-PrioritizationTwoStep-r16        RA-Prioritization
OPTIONAL,    -- Need N
    cfra-TwoStep-r16                    CFRA-TwoStep-r16
OPTIONAL    -- Need N
    ]]
}
CFRA ::=                            SEQUENCE {
    occasions                           SEQUENCE {
       rach-ConfigGeneric                  RACH-ConfigGeneric,
       ssb-perRACH-Occasion                ENUMERATED {oneEighth, oneFourth, oneHalf, one,
two, four, eight, sixteen}
OPTIONAL    -- Cond SSB-CFRA
    }
OPTIONAL,    -- Need S
    resources                           CHOICE {
       ssb                                 SEQUENCE {
```

```
      ssb-ResourceList                    SEQUENCE (SIZE (1..maxRA-SSB-Resources)) OF
CFRA-SSB-Resource,
      ra-ssb-OccasionMaskIndex            INTEGER (0..15)
    },
    csirs                                 SEQUENCE {
      csirs-ResourceList                  SEQUENCE (SIZE (1..maxRA-CSIRS-Resources))
OF CFRA-CSIRS-Resource,
      rsrp-ThresholdCSI-RS                RSRP-Range
    }
  },
  ...,
  [[
  totalNumberOfRA-Preambles    INTEGER (1..63)
OPTIONAL    -- Cond Occasions
  ]]
}
CFRA-TwoStep-r16 ::=                      SEQUENCE {
  occasionsTwoStepRA-r16                    SEQUENCE {
    rach-ConfigGenericTwoStepRA-r16         RACH-ConfigGeneric,
    ssb-PerRACH-OccasionTwoStepRA-r16       ENUMERATED {oneEighth, oneFourth,
oneHalf, one,
                                              two, four, eight, sixteen}
OPTIONAL    -- Cond SSB-CFRA
  }
OPTIONAL,   -- Need S
  msgA-CFRA-PUSCH-r16                     MsgA-PUSCH-Config-r16,
  resourcesTwoStep-r16                    CHOICE {
    ssb                                     SEQUENCE {
      ssb-ResourceList                      SEQUENCE (SIZE (1..maxRA-SSB-
Resources)) OF CFRA-SSB-Resource,
      ra-ssb-OccasionMaskIndex              INTEGER (0..15)
    },
    csirs                                 SEQUENCE {
      csirs-ResourceList                    SEQUENCE (SIZE (1..maxRA-CSIRS-
Resources)) OF CFRA-CSIRS-Resource,
      rsrp-ThresholdCSI-RS                RSRP-Range
    }
  },
  totalNumberOfTwoStepRA-Preambles-r16    INTEGER (1..62),
  ...
}
CFRA-SSB-Resource ::=                     SEQUENCE {
  ssb                                     SSB-Index,
  ra-PreambleIndex                        INTEGER (0..63),
  ...
}
CFRA-CSIRS-Resource ::=                   SEQUENCE {
  csi-RS                                  CSI-RS-Index,
  ra-OccasionList                         SEQUENCE (SIZE (1..maxRA-OccasionsPerCSIRS)) OF
INTEGER (0..maxRA-Occasions-1),
  ra-PreambleIndex                        INTEGER (0..63),
  ...
}
-- TAG-RACH-CONFIGDEDICATED-STOP
-- ASN1STOP
```

For beam failure recovery (BFR), when the current beam is detected to be as a failure, a list of ROs may also be provided in BFR-CSIRS-Resource, as shown in below signaling.

```
-- ASN1START
-- TAG-BEAMFAILURERECOVERYCONFIG-START
BeamFailureRecoveryConfig ::=    SEQUENCE {
  rootSequenceIndex-BFR              INTEGER (0..137)
OPTIONAL,    -- Need M
  rach-ConfigBFR                     RACH-ConfigGeneric
OPTIONAL,    -- Need M
  rsrp-ThresholdSSB                  RSRP-Range
OPTIONAL,    -- Need M
  candidateBeamRSList                SEQUENCE (SIZE (1..maxNrofCandidateBeams)) OF
PRACH-ResourceDedicatedBFR    OPTIONAL,    -- Need M
  ssb-perRACH-Occasion               ENUMERATED {oneEighth, oneFourth, oneHalf, one,
two,
                                       four, eight, sixteen}
OPTIONAL,    -- Need M
```

```
    ra-ssb-OccasionMaskIndex          INTEGER (0..15)
OPTIONAL,    -- Need M
    recoverySearchSpaceId             SearchSpaceId
OPTIONAL,    -- Need R
    ra-Prioritization                 RA-Prioritization
OPTIONAL,    -- Need R
    beamFailureRecoveryTimer          ENUMERATED {ms10, ms20, ms40, ms60, ms80,
ms100, ms150, ms200}                  OPTIONAL,    -- Need M
    ... ,
    [[
    msg1-SubcarrierSpacing            SubcarrierSpacing
OPTIONAL,    -- Need M
    ]],
    [[
    ra-PrioritizationTwoStep-r16      RA-Prioritization
OPTIONAL    -- Need R
    ]]
}
PRACH-ResourceDedicatedBFR ::=        CHOICE {
    ssb                               BFR-SSB-Resource,
    csi-RS                            BFR-CSIRS-Resource
}
BFR-SSB-Resource ::=                  SEQUENCE {
    ssb                               SSB-Index,
    ra-PreambleIndex                  INTEGER (0..63),
    ...
}
BFR-CSIRS-Resource ::=                SEQUENCE {
    csi-RS                            NZP-CSI-RS-ResourceId,
    ra-OccasionList                   SEQUENCE (SIZE (1..maxRA-Occasions PerCSIRS)) OF
INTEGER (0..maxRA-Occasions-1)        OPTIONAL,    -- Need R
    ra-PreambleIndex                  INTEGER (0..63)
OPTIONAL,    -- Need R
    ...
}
-- TAG-BEAMFAILURERECOVERYCONFIG-STOP
-- ASN1STOP
```

The ra-OccasionList in the above signaling is defined as below:
  ra-OccasionList
    RA occasions that the UE shall use when performing BFR upon selecting the candidate beam identified by this CSI-RS. The network ensures that the RA occasion indexes provided herein are also configured by prach-ConfigurationIndex and msg1-FDM. Each RACH occasion is sequentially numbered, first, in increasing order of frequency resource indexes for frequency multiplexed PRACH occasions; second, in increasing order of time resource indexes for time multiplexed PRACH occasions within a PRACH slot; and third, in increasing order of indexes for PRACH slots. If the field is absent, the UE uses the RA occasion associated with the SSB that is quasi co-located (QCLed) with this CSI-RS.

As mentioned above, the RACH occasions associated with CSI-RS are only defined as a subset of the ROs defined for 4-step RACH via the configuration parameters prach-ConfigurationIndex and msg1-FDM. However, for operation with 2-step RACH only, there will be no 4-step ROs available. This means the ROs should be either dedicatedly configured for CSI-RS or be a subset of common ROs or dedicated ROs associated with SSBs for 2-step RACH. Even if the 4-step RACH is available, whether the ROs associated with CSI-RS for 2-step RA should be a subset of ROs for 4-step RACH needs to be further discussed.

The present disclosure proposes an improved solution for 2-step random access procedure. The solution may be applied to a wireless communication system including a terminal device and an access network node such as a base station. The terminal device can communicate through a radio access communication link with the base station. The base station can provide radio access communication links to terminal devices that are within its communication service cell. The base station may be, for example, a gNB in NR. Note that the communications may be performed between the terminal device and the base station according to any suitable communication standards and protocols. The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3rd generation partnership project (3GPP) context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Now, several embodiments will be described to explain the improved solution for random access procedure.

As a first embodiment, the set of ROs associated with CSI-RS may be from a set of common ROs defined for 2-step RACH. In other words, the set of ROs associated with CSI-RS may be a subset of common ROs defined for 2-step RACH. With this embodiment, the ROs will not require the coexistence of 2-step RACH and 4-step RACH, i.e. the 2-step RACH only operation is possible.

As an example for CFRA, the ra-OccasionList included in the CFRA-CSIRS-Resource can be defined as below for 2-step RACH (the proposed update to the current technical specification is underlined):
ra-OccasionList
RA occasions that the UE shall use when performing CF-RA upon selecting the candidate beam identified by this CSI-RS. The network ensures that the RA occasion indexes provided herein are also configured by prach-ConfigurationIndex and msg1-FDM for 4-step RACH, or by msgA-PRACH-ConfigurationIndex and msgA-RO-FDM for 2-step RACH. Each RACH occasion is sequentially numbered, first, in increasing order of frequency resource indexes for frequency multiplexed PRACH occasions; second, in increasing order of time resource indexes for time multiplexed PRACH occasions within a PRACH slot; and third, in increasing order of indexes for PRACH slots.

As another example for BFR, the ra-OccasionList included in BFR-CSIRS-Resource can be defined as below when 2-step RACH is selected:
ra-OccasionList
RA occasions that the UE shall use when performing BFR upon selecting the candidate beam identified by this CSI-RS. The network ensures that the RA occasion indexes provided herein are also configured by prach-ConfigurationIndex and msg1-FDM for 4-step RACH, or by msgA-PRACH-ConfigurationIndex and msgA-RO-FDM for 2-step RACH. Each RACH occasion is sequentially numbered, first, in increasing order of frequency resource indexes for frequency multiplexed PRACH occasions; second, in increasing order of time resource indexes for time multiplexed PRACH occasions within a PRACH slot; and third, in increasing order of indexes for PRACH slots.
If the field is absent, the UE uses the RA occasion associated with the SSB that is QCLed with this CSI-RS.

In one variant of the above first embodiment, when the ROs of 4-step RACH and 2-step RACH are shared, the set of ROs associated with CSI-RS for 2-step RACH may be from the set of common ROs defined for 4-step RACH.

In another variant of the above first embodiment, when the ROs of 4-step RACH and 2-step RACH are separately configured, the set of ROs associated with CSI-RS for 2-step RACH may be from the set of common ROs defined for 2-step RACH.

As an example for CFRA, the ra-OccasionList included in the CFRA-CSIRS-Resource can be defined as below for 2-step RACH:
ra-OccasionList
RA occasions that the UE shall use when performing CF-RA upon selecting the candidate beam identified by this CSI-RS. The network ensures that the RA occasion indexes provided herein are also configured by prach-ConfigurationIndex and msg1-FDM for 4-step RACH and for 2-step RACH when ROs for 2-step are shared with 4-step, or by msgA-PRACH-ConfigurationIndex and msgA-RO-FDM for 2-step RACH when ROs for 2-step are not shared with 4-step. Each RACH occasion is sequentially numbered, first, in increasing order of frequency resource indexes for frequency multiplexed PRACH occasions; second, in increasing order of time resource indexes for time multiplexed PRACH occasions within a PRACH slot; and third, in increasing order of indexes for PRACH slots.

As another example for BFR, the ra-OccasionList included in BFR-CSIRS-Resource can be defined as below when 2-step RACH is selected:
ra-OccasionList
RA occasions that the UE shall use when performing BFR upon selecting the candidate beam identified by this CSI-RS. The network ensures that the RA occasion indexes provided herein are also configured by prach-ConfigurationIndex and msg1-FDM for 4-step RACH and for 2-step RACH when ROs for 2-step are shared with 4-step, or by msgA-PRACH-ConfigurationIndex and msgA-RO-FDM for 2-step RACH when ROs for 2-step are not shared with 4-step. Each RACH occasion is sequentially numbered, first, in increasing order of frequency resource indexes for frequency multiplexed PRACH occasions; second, in increasing order of time resource indexes for time multiplexed PRACH occasions within a PRACH slot; and third, in increasing order of indexes for PRACH slots.
If the field is absent, the UE uses the RA occasion associated with the SSB that is QCLed with this CSI-RS.

As a second embodiment, the set of ROs associated with CSI-RS may be from a set of dedicated ROs defined for 2-step RACH CFRA. In other words, the set of ROs associated with CSI-RS may be a subset of dedicated ROs defined for 2-step RACH CFRA. For example, the dedicated ROs defined for 2-step RACH CFRA may be associated with SSBs. In this way, more flexibly configured ROs can be dedicated for the UE via reusing the dedicated ROs configured for the SSB association.

As an exemplary example, a subset of ROs defined by occasionsTwoStepRA in CFRA-TwoStep as shown blow can be used for ROs in ra-OccasionList in CFRA-CSIRS-Resource.

```
CFRA-TwoStep-r16 ::=                    SEQUENCE {
    occasionsTwoStepRA-r16                  SEQUENCE {
        rach-ConfigGenericTwoStepRA-r16         RACH-ConfigGeneric,
        ssb-ConfigGenericTwoSeptRA-r16          ENUMERATED {oneEighth, oneFourth,
oneHalf, one,
                                                    two, four, eight, sixteen}
OPTIONAL     -- Cond SSB-CFRA
    }
OPTIONAl,    -- Need S
    msgA-CFRA-PUSCH-r16                     MsgA-PUSCH-Config-r16,
    resourcesTwoStep-r16                    CHOICE {
        ssb                                     SEQUENCE {
            ssb-ResourceList                        SEQUENCE (SIZE(1..maxRa-SSB-
```

-continued

```
Resources)) OF CFRA-SSB-Resource,
        ra-ssb-OccasionMaskIndex              INTEGER (0..15)
    },
    csirs                                     SEQUENCE {
        csirs-ResourceList                        SEQUENCE (SIZE (1..maxRA-CSIRS-
Resources)) OF CFRA-CSIRS-Resource,
        rsrp-ThresholdCSI-RS                      RSRP-Range
    }
},
totalNumberOfTwoStepRA-Preambles-r16    INTEGER (1..62),
...
}
CFRA-SSB-Resource ::=       SEQUENCE {
    ssb                         SSB-Index,
    ra-PreambleIndex            INTEGER (0..63),
    ...
}
CFRA-CSIRS-Resource ::=     SEQUENCE {
    csi-RS                      CSI-RS-Index,
    ra-OccasionList             SEQUENCE (SIZE (1..maxRA-Occasions PerCSIRS)) OF
INTEGER (0..maxRA-Occasions-1),
    ra-PreambleIndex            INTEGER (0..63),
    ...
}
-- TAG-RACH-CONFIGDEDICATED-STOP
-- ASN1STOP
```

The ra-OccasionList can be defined as below:
ra-OccasionList
RA occasions that the UE shall use when performing CF-RA upon selecting the candidate beam identified by this CSI-RS. The network ensures that the RA occasion indexes provided herein are also configured by prach-ConfigurationIndex and msg1-FDM for 4-step RACH, or by msgA-PRACH-ConfigurationIndex and msgA-RO-FDM for 2-step RACH. Each RACH occasion is sequentially numbered, first, in increasing order of frequency resource indexes for frequency multiplexed PRACH occasions; second, in increasing order of time resource indexes for time multiplexed PRACH occasions within a PRACH slot; and third, in increasing order of indexes for PRACH slots.

As a third embodiment, the set of ROs associated with CSI-RS may be from a set of dedicated ROs separately configured for CSI-RS in 2-step RACH. This means the set of ROs associated with CSI-RS may be a set of dedicated ROs separately configured for 2-step RACH. In this way, the full flexibility can be provided for the RO configuration with respect to CSI-RS.

As an exemplary example, a new IE occasionsCSIRSTwoStepRA can be used to define a set of ROs that can be used by ra-OccasionList in CFRA-CSIRS-Resource, as shown below.

```
CFRA-TwoStep-r16 ::=                            SEQUENCE {
    occasionsTwoStepRA-r16                          SEQUENCE {
        rach-ConfigGenericTwoStepRA-r16                 RACH-ConfigGeneric,
        ssb-PerRACH-OccasionTwoStepRA-r16               ENUMERATED {oneEighth, oneFourth,
oneHalf, one,
                                                            two, four, eight, sixteen}
    OPTIONAL    -- Cond SSB-CFRA
    }
    OPTIONAL,    -- Need S
    occasionsCSIRSTwoStepRA-r16                     SEQUENCE {
        rach-ConfigGenericTwoStepRA-r16                 RACH-ConfigGeneric,
    }
    OPTIONAL,    -- Need S
    msgA-CFRA-PUSCH-r16                             MsgA-PUSCH-Config-r16,
    resourcesTwoStep-r16                            CHOICE {
        ssb                                             SEQUENCE {
            ssb-ResourceList                                SEQUENCE (SIZE(1..maxRA-SSB-
Resources)) OF CFRA-SSB-Resource,
            ra-ssb-OccasionMaskIndex                        INTEGER (0..15)
        },
        csirs                                           SEQUENCE {
            csirs-ResourceList                              SEQUENCE (SIZE (1..maxRA-CSIRS-
Resources)) OF CFRA-CSIRS-Resource,
            rsrp-ThresholdCSI-RS                            RSRP-Range
        }
    },
    totalNumberOfTwoStepRA-Preambles-r16    INTEGER (1..62),
    ...
}
CFRA-SSB-Resource ::=       SEQUENCE {
    ssb                         SSB-Index,
    ra-PreambleIndex            INTEGER (0..63),
```

```
...
}
CFRA-CSIRS-Resource ::=        SEQUENCE {
    csi-RS                         CSI-RS-Index,
    ra-OccasionList                SEQUENCE (SIZE (1..maxRA-Occasions PerCSIRS)) OF
INTEGER (0..maxRA-Occasions-1),
    ra-PreambleIndex               INTEGER (0..63),
    ...
}
-- TAG-RACH-CONFIGDEDICATED-STOP
-- ASN1STOP
```

The ra-OccasionList can be defined as below:
ra-OccasionList
RA occasions that the UE shall use when performing CF-RA upon selecting the candidate beam identified by this CSI-RS. The network ensures that the RA occasion indexes provided herein are also configured by prach-ConfigurationIndex and msg1-FDM for 4-step RACH or by msgA-PRACH-ConfigurationIndex and msgA-RO-FDM for 2-step RACH. Each RACH occasion is sequentially numbered, first, in increasing order of frequency resource indexes for frequency multiplexed PRACH occasions; second, in increasing order of time resource indexes for time multiplexed PRACH occasions within a PRACH slot; and third, in increasing order of indexes for PRACH slots.

As another example for BFR, a new IE occasionsCSIRSTwoStepRA can be used to define a set of ROs that can be used by ra-OccasionList in BFR-CSIRS-Resource, as shown below.

```
BeamFailureRecoveryConfig ::=              SEQUENCE {
    rootSequenceIndex-BFR                      INTEGER (0..137)
OPTIONAL,    -- Need M
    rach-ConfigBFR                             RACH-ConfigGeneric
OPTIONAL,    -- Need M
    rsrp-ThresholdSSB                          RSRP-Range
OPTIONAL,    -- Need M
    candidateBeamRSList                        SEQUENCE (SIZE (1..maxNrofCandidateBeams)) OF
PRACH-ResourceDedicatedBFR    OPTIONAL,    -- Need M
    occasionsCSIRSTwoStepRA-r16                SEQUENCE {
        rach-ConfigGenericTwoStepRA-r16            RACH-ConfigGeneric,
    }
OPTIONAL,    -- Need M
    ssb-perRACH-Occasion                       ENUMERATED {oneEighth, oneFourth, oneHalf, one,
two,
                                                          four, eight, sixteen}
OPTIONAL,    -- Need M
    ra-ssb-OccasionMaskIndex                   INTEGER (0..15)
OPTIONAL,    -- Need M
    recoverySearchSpaceId                      SearchSpaceId
OPTIONAL,    -- Need R
    ra-Prioritization                          RA-Prioritization
OPTIONAL,    -- Need R
    beamFailureRecoveryTimer                   ENUMERATED {ms10, ms20, ms40, ms60, ms80,
ms100, ms150, ms200}        OPTIONAL,    -- Need M
    ...,
    [[
    msg1-SubcarrierSpacing                     SubcarrierSpacing
OPTIONAL    -- Need M
    ]],
    [[
    ra-PrioritizationTwoStep-r16               RA-Prioritization
OPTIONAL    -- Need R
    ]]
}
PRACH-ResourceDedicatedBFR ::=              CHOICE {
    ssb                                        BFR-SSB-Resource,
    csi-RS                                     BFR-CSIRS-Resource
}
BFR-SSB-Resource ::=                        SEQUENCE {
    ssb                                        SSB-Index,
    ra-PreambleIndex                           INTEGER (0..63),
    ...
}
BFR-CSIRS-Resource ::=                      SEQUENCE {
    csi-RS                                     NZP-CSI-RS-ResourceId,
    ra-OccasionList                            SEQUENCE (SIZE (1..maxRA-OccasionsPerCSIRS)) OF
INTEGER (0..maxRA-Occasions-1)    OPTIONAL,    -- Need R
    ra-PreambleIndex                           INTEGER (0..63)
OPTIONAL,    -- Need R
    ...
```

-continued

}
-- TAG-BEAMFAILURERECOVERYCONFIG-STOP
-- ASN1STOP

The ra-OccasionList can be defined as below:
ra-OccasionList
RA occasions that the UE shall use when performing BFR upon selecting the candidate beam identified by this CSI-RS. The network ensures that the RA occasion indexes provided herein are also configured by prach-ConfigurationIndex and msg1-FDM for 4-step RACH, or by msgA-PRACH-ConfigurationIndex and msgA-RO-FDM for 2-step RACH. Each RACH occasion is sequentially numbered, first, in increasing order of frequency resource indexes for frequency multiplexed PRACH occasions; second, in increasing order of time resource indexes for time multiplexed PRACH occasions within a PRACH slot; and third, in increasing order of indexes for PRACH slots.
If the field is absent the UE uses the RA occasion associated with the SSB that is QCLed with this CSI-RS.

As a fourth embodiment, the set of ROs associated with CSI-RS for 2-step RACH may be from a set of ROs for 4-step RACH if the 4-step ROs are available. In other words, the set of ROs associated with CSI-RS for 2-step RACH may be a subset of ROs for 4-step RACH if the 4-step ROs are available. This reduces the signaling for 2-step RA for CSI-RS associated ROs, but it means the 2-step RA will be restricted to share ROs with 4-step RA for CSI-RS associated CFRA, or restricted to 2-step RACH only operation.

As an example for CFRA, the ra-OccasionList included in the CFRA-CSIRS-Resource can be defined as below for 2-step RACH:
ra-OccasionList
RA occasions that the UE shall use when performing CF-RA upon selecting the candidate beam identified by this CSI-RS. The network ensures that the RA occasion indexes provided herein are also configured by prach-ConfigurationIndex and msg1-FDM if available, otherwise by msgA-PRACH-ConfigurationIndex and msgA-RO-FDM for 2-step RACH. Each RACH occasion is sequentially numbered, first, in increasing order of frequency resource indexes for frequency multiplexed PRACH occasions; second, in increasing order of time resource indexes for time multiplexed PRACH occasions within a PRACH slot; and third, in increasing order of indexes for PRACH slots.
If the field is absent, the UE uses the RA occasion associated with the SSB that is QCLed with this CSI-RS.

As another example for BFR, the ra-OccasionList included in BFR-CSIRS-Resource can be defined as below when 2-step RACH is selected:
ra-OccasionList
RA occasions that the UE shall use when performing BFR upon selecting the candidate beam identified by this CSI-RS. The network ensures that the RA occasion indexes provided herein are also configured by prach-ConfigurationIndex and msg1-FDM if available, otherwise by msgA-PRACH-ConfigurationIndex and msgA-RO-FDM for 2-step RACH. Each RACH occasion is sequentially numbered, first, in increasing order of frequency resource indexes for frequency multiplexed PRACH occasions; second, in increasing order of time resource indexes for time multiplexed PRACH occasions within a PRACH slot; and third, in increasing order of indexes for PRACH slots.
If the field is absent, the UE uses the RA occasion associated with the SSB that is QCLed with this CSI-RS.

Figure 5:
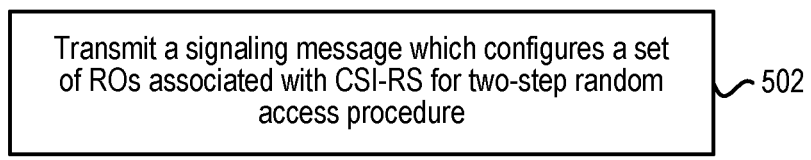
FIG. 5 is a flowchart illustrating a method implemented at an access network node according to an embodiment of the disclosure.

Hereinafter, the solution will be further described with reference to FIGS. 5-15. FIG. 5 is a flowchart illustrating a method implemented at an access network node according to an embodiment of the disclosure. At block 502, the access network node transmits a signaling message which configures a set of ROs associated with CSI-RS for two-step random access procedure. In this way, two-step random access only operation is possible.

For example, there may be four options for determining the set of ROs associated with CSI-RS at block 502. As the first option, the set of ROs associated with CSI-RS for two-step random access procedure may be from a set of common ROs configured for two-step random access procedure. For this option, the two-step random access procedure may be CFRA procedure or may be used for BFR.

As an example for the first option, the set of common ROs configured for two-step random access procedure may be shared with four-step random access procedure. In this case, the set of ROs associated with CSI-RS for two-step random access procedure may be from a set of common ROs configured for four-step random access procedure. Thus, the set of ROs associated with CSI-RS for two-step random access procedure may be configured by one or more of following parameters: PRACH configuration index for defining the set of common ROs for four-step random access procedure; the number of PRACH transmission occasions frequency division multiplexed in one time instance for defining the set of common ROs for four-step random access procedure; and an offset of the lowest PRACH transmission occasion in frequency domain with respective to PRB 0 for defining the common set of ROs for four-step random access procedure. As an exemplary example, the PRACH configuration index may be provided in an IE "prach-ConfigurationIndex". The number of PRACH transmission occasions may be provided in an IE "msg1-FDM". The offset of the lowest PRACH transmission occasion may be provided in an IE "msg1-FrequencyStart".

As another example for the first option, the set of common ROs configured for two-step random access procedure may be not shared with four-step random access procedure. In this case, the set of ROs associated with CSI-RS for two-step random access procedure may be configured by one or more of following parameters: PRACH configuration index for defining the set of common ROs for two-step random access procedure; the number of PRACH transmission occasions frequency division multiplexed in one time instance for defining the set of common ROs for two-step random access procedure; and an offset of the lowest PRACH transmission occasion in frequency domain with respective to PRB 0 for defining the common set of ROs for two-step random access procedure. As an exemplary example, the PRACH configuration index may be provided in an IE "msgA-PRACH-ConfigurationIndex". The number of PRACH transmission occasions may be provided in an IE "msgA-RO-FDM". The offset of the lowest PRACH transmission occasion may be provided in an IE "msgA-RO-FDM".

As the second option for block 502, the set of ROs associated with CSI-RS for two-step random access procedure may be a set of dedicated ROs separately configured for two-step random access procedure. In this way, the full flexibility can be provided for the RO configuration with respect to CSI-RS. As an exemplary example, a new IE "occasionsCSIRSTwoStepRA" may be used for configuring the set of ROs associated with CSI-RS for two-step random access procedure. For this second option, the two-step random access procedure may be CFRA procedure or may be used for BFR.

As the third option for block 502, the set of ROs associated with CSI-RS for two-step random access procedure may be from a set of ROs configured for four-step random access procedure. The set of ROs associated with CSI-RS for two-step random access procedure may be configured by the signaling message which explicitly configures the set of ROs for four-step random access procedure. In this way, the signaling for two-step RA can be reduced for CSI-RS associated ROs. For this third option, the two-step random access procedure may be CFRA procedure or may be used for BFR.

As the fourth option for block 502, the set of ROs associated with CSI-RS for two-step random access procedure may be from a set of dedicated ROs configured for two-step random access procedure. For this option, the two-step random access procedure may be CFRA procedure. For example, the set of dedicated ROs configured for two-step random access procedure may be associated with SSB. In this way, the set of ROs associated with CSI-RS can be flexibly configured by reusing the dedicated ROs configured for the SSB association. As an exemplary example, the set of dedicated ROs configured for two-step random access procedure may be configured in an IE "RACH-ConfigDedicated", such as configured by an IE "occasionsTwoStepRA" contained in an IE "CFRA-TwoStep".

Figure 6:
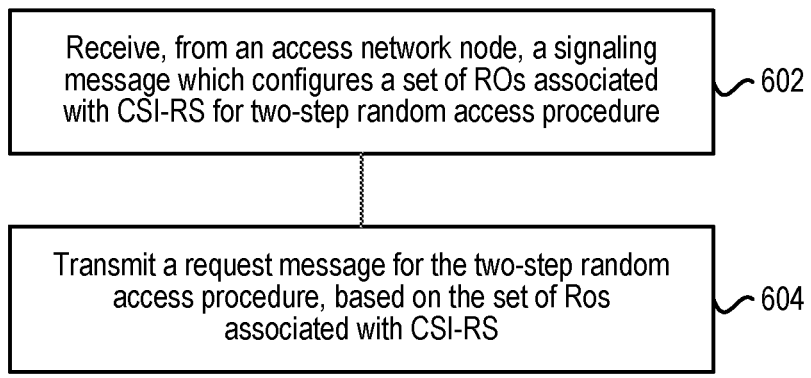
FIG. 6 is a flowchart illustrating a method implemented at a terminal device according to an embodiment of the disclosure.

FIG. 6 is a flowchart illustrating a method implemented at a terminal device according to an embodiment of the disclosure. At block 602, the terminal device receives, from an access network node, a signaling message which configures a set of ROs associated with CSI-RS for two-step random access procedure. Block 602 corresponds to block 502. As described above with respect to block 502, there may be four options for the access network node to configure the set of ROs associated with CSI-RS. Correspondingly, in each of the four options, the terminal device can determine, from the signaling message, the set of ROs associated with CSI-RS. At block 604, the terminal device transmits a request message for the two-step random access procedure, based on the set of ROs associated with CSI-RS. For example, the RO(s) corresponding to the CSI-RS(s) with CSI reference signal received power (CSI-RSRP) above a RSRP threshold amongst the CSI-RSs in the candidate beam reference signal (RS) list may be selected from the set of ROs associated with CSI-RS and then be used for transmitting a PRACH preamble in the request message.

Based on the above description, at least one aspect of the present disclosure provides a method implemented in a communication system including an access network node and at least one terminal device. The method comprises, at the access network node, transmitting a signaling message which configures a set of ROs associated with CSI-RS for two-step random access procedure. The method further comprises, at the at least one terminal device, receiving, from the access network node, the signaling message which configures the set of ROs associated with CSI-RS for two-step random access procedure. The method further comprises, at the at least one terminal device, transmitting a request message for the two-step random access procedure, based on the set of ROs associated with CSI-RS.

Figure 7:
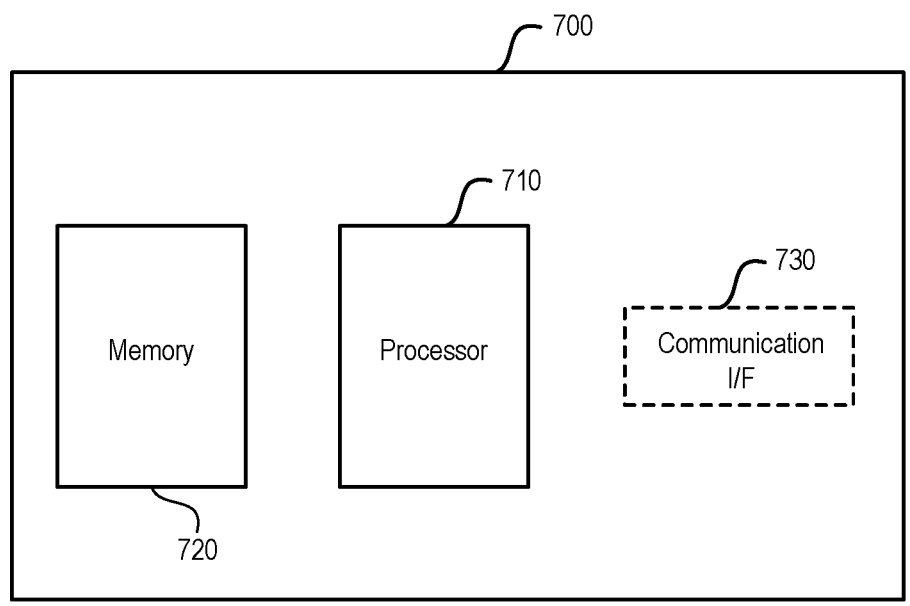
FIG. 7 is a block diagram showing an apparatus suitable for use in practicing some embodiments of the disclosure.

FIG. 7 is a block diagram showing an apparatus suitable for use in practicing some embodiments of the disclosure. For example, any one of the access network node and the terminal device described above may be implemented through the apparatus 700. As shown, the apparatus 700 may include a processor 710, a memory 720 that stores a program, and optionally a communication interface 730 for communicating data with other external devices through wired and/or wireless communication.

The program includes program instructions that, when executed by the processor 710, enable the apparatus 700 to operate in accordance with the embodiments of the present disclosure, as discussed above. That is, the embodiments of the present disclosure may be implemented at least in part by computer software executable by the processor 710, or by hardware, or by a combination of software and hardware.

The memory 720 may be of any type suitable to the local technical environment and may be implemented using any suitable data storage technology, such as semiconductor based memory devices, flash memories, magnetic memory devices and systems, optical memory devices and systems, fixed memories and removable memories. The processor 710 may be of any type suitable to the local technical environment, and may include one or more of general purpose computers, special purpose computers, microprocessors, digital signal processors (DSPs) and processors based on multi-core processor architectures, as non-limiting examples.

Figure 8:
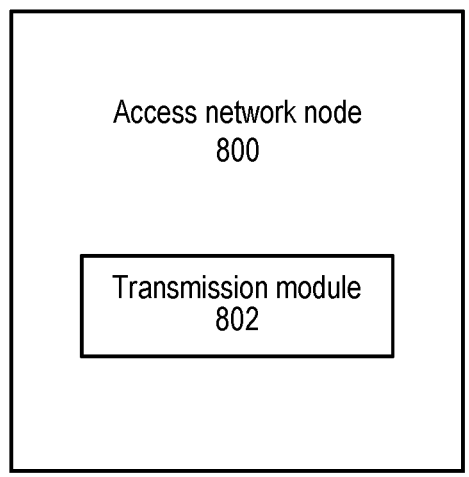
FIG. 8 is a block diagram showing an access network node according to an embodiment of the disclosure.

FIG. 8 is a block diagram showing an access network node according to an embodiment of the disclosure. As shown, the access network node 800 comprises a transmission module 802. The transmission module 802 may be configured to transmit a signaling message which configures a set of ROs associated with CSI-RS for two-step random access procedure, as described above with respect to block 502.

Figure 9:
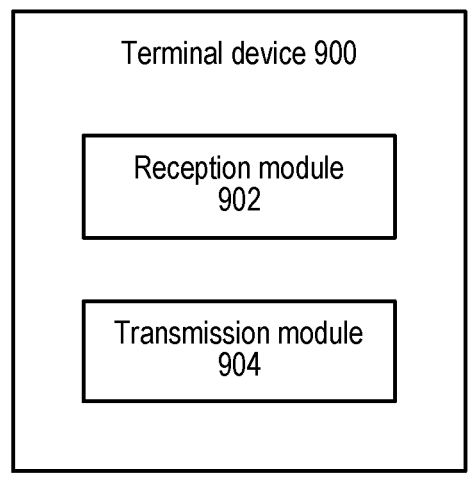
FIG. 9 is a block diagram showing a terminal device according to an embodiment of the disclosure.

FIG. 9 is a block diagram showing a terminal device according to an embodiment of the disclosure. As shown, the terminal device 900 comprises a reception module 902 and a transmission module 904. The reception module 902 may be configured to receive, from an access network node, a signaling message which configures a set of ROs associated with CSI-RS for two-step random access procedure, as described above with respect to block 602. The transmission module 904 may be configured to transmit a request message for the two-step random access procedure, based on the set of ROs associated with CSI-RS, as described above with respect to block 604. The modules described above may be implemented by hardware, or software, or a combination of both.

Based on the above description, at least one aspect of the present disclosure provides a communication system comprising an access network node and at least one terminal device. The access network node is configured to transmit a signaling message which configures a set of ROs associated with CSI-RS for two-step random access procedure. The at least one terminal device is configured to receive, from the access network node, the signaling message which configures the set of ROs associated with CSI-RS for two-step random access procedure, and transmit a request message for the two-step random access procedure, based on the set of ROs associated with CSI-RS.

Figure 10:
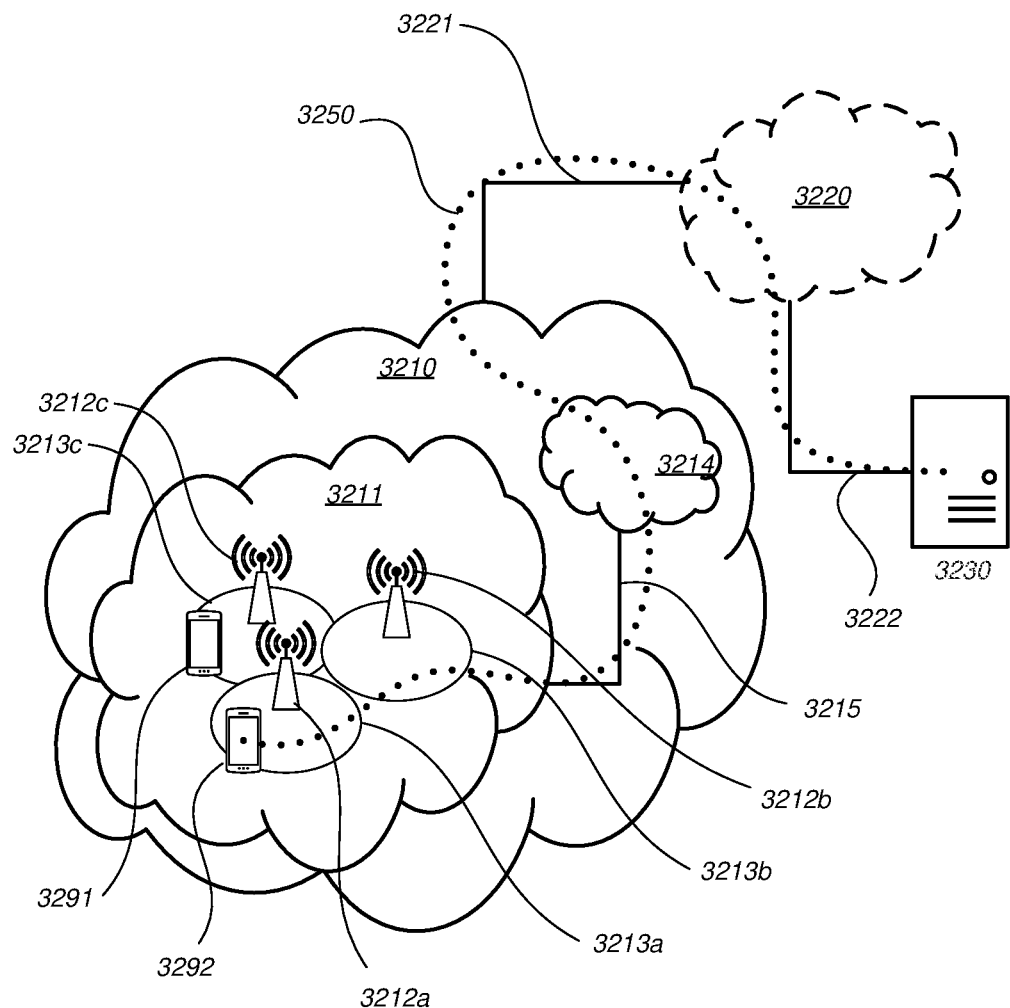
FIG. 10 is a diagram showing a telecommunication network connected via an intermediate network to a host computer in accordance with some embodiments.

With reference to FIG. 10, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 10 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 11) served by base station 3320. Communication interface 3326 may be configured to facilitate connection 3360 to host computer 3310. Connection 3360 may be direct or it may pass through a core network (not shown in FIG. 11) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 11:
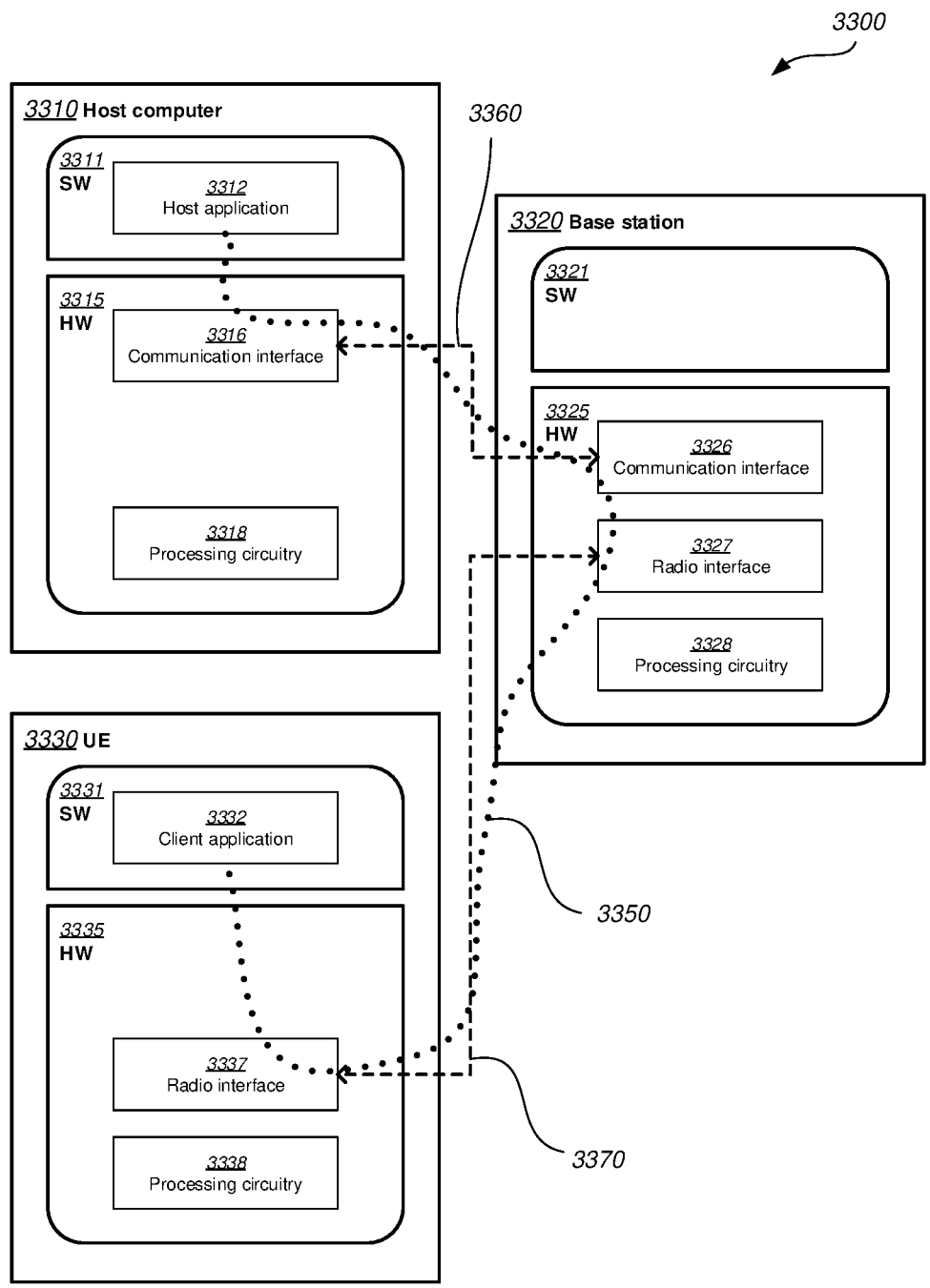
FIG. 11 is a diagram showing a host computer communicating via a base station with a user equipment in accordance with some embodiments.

It is noted that host computer 3310, base station 3320 and UE 3330 illustrated in FIG. 11 may be similar or identical to host computer 3230, one of base stations 3212a, 3212b, 3212c and one of UEs 3291, 3292 of FIG. 10, respectively.

This is to say, the inner workings of these entities may be as shown in FIG. 11 and independently, the surrounding network topology may be that of FIG. 10.

In FIG. 11, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 12:
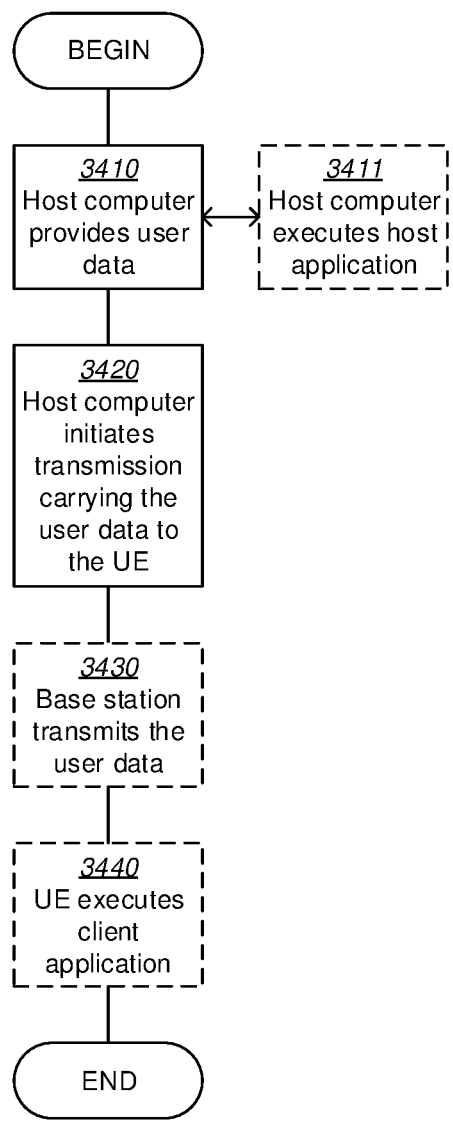
FIG. 12 is a flowchart illustrating a method implemented in a communication system in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 13:
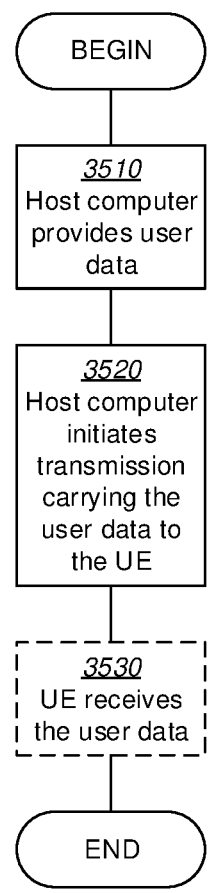
FIG. 13 is a flowchart illustrating a method implemented in a communication system in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 14:
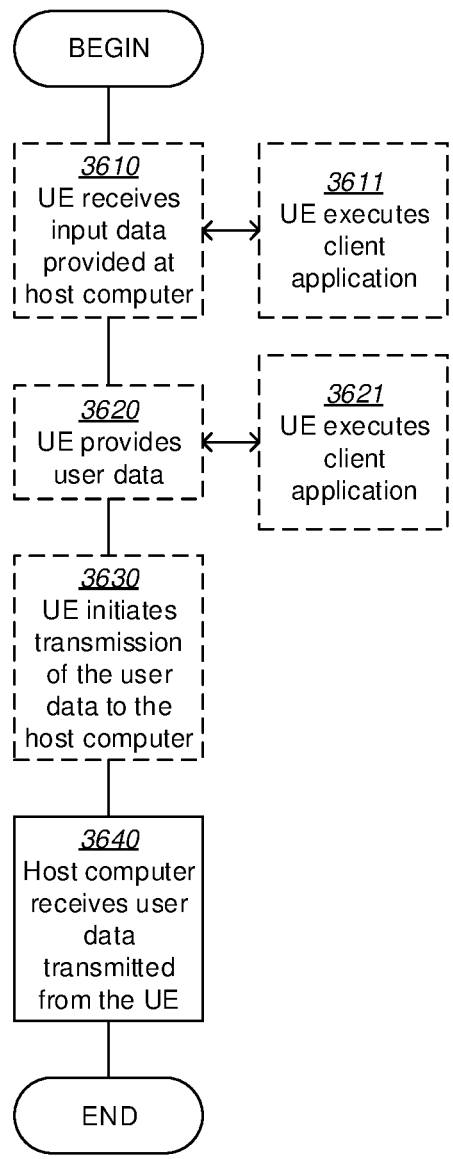
FIG. 14 is a flowchart illustrating a method implemented in a communication system in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 15:
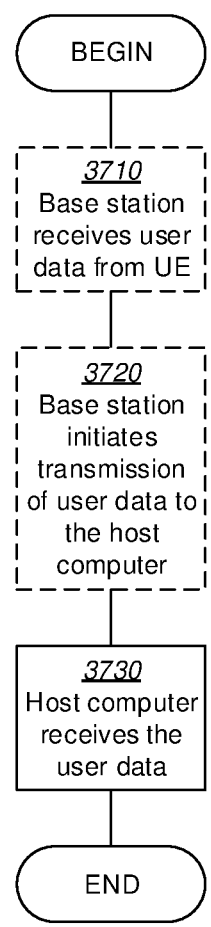
FIG. 15 is a flowchart illustrating a method implemented in a communication system in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The base station transmits a signaling message which configures a set of ROs associated with CSI-RS for two-step random access procedure.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

According to another aspect of the disclosure, there is provided a communication system including a host computer comprising processing circuitry configured to provide user data and a communication interface configured to forward the user data to a cellular network for transmission to a terminal device. The cellular network comprises a base station having a radio interface and processing circuitry. The base station's processing circuitry is configured to transmit a signaling message which configures a set of ROs associated with CSI-RS for two-step random access procedure.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

According to yet another aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The terminal device receives, from an access network node, a signaling message which configures a set of ROs associated with CSI-RS for two-step random access procedure. The terminal device transmits a request message for the two-step random access procedure, based on the set of ROs associated with CSI-RS.

In an embodiment of the disclosure, the method may further comprise, at the terminal device, receiving the user data from the base station.

According to yet another aspect of the disclosure, there is provided a communication system including a host computer comprising processing circuitry configured to provide user data and a communication interface configured to forward user data to a cellular network for transmission to a terminal device. The terminal device comprises a radio interface and processing circuitry. The processing circuitry of the terminal device is configured to receive, from an access network node, a signaling message which configures a set of ROs associated with CSI-RS for two-step random access procedure. The processing circuitry of the terminal device is further configured to transmit a request message for the two-step random access procedure, based on the set of ROs associated with CSI-RS.

In an embodiment of the disclosure, the communication system may further include the terminal device.

In an embodiment of the disclosure, the cellular network may further include a base station configured to communicate with the terminal device.

In an embodiment of the disclosure, the processing circuitry of the host computer may be configured to execute a host application, thereby providing the user data. The processing circuitry of the terminal device may be configured to execute a client application associated with the host application.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by an access network node comprising:
   transmitting a signaling message which configures a set of physical random access channel (PRACH) occasions (ROs) associated with channel state information reference signal (CSI-RS) for two-step random access procedure, wherein
   the set of ROs associated with CSI-RS for two-step random access procedure is from a set of common ROs configured for two-step random access procedure,
   the set of common ROs configured for two-step random access procedure is shared with four-step random access procedure, and
   the set of ROs associated with CSI-RS for two-step random access procedure is from a set of common ROs configured for four-step random access procedure.

2. A method performed by a terminal device comprising:
   receiving, from an access network node, a signaling message which configures a set of physical random access channel (PRACH) occasions (ROs) associated with channel state information reference signal (CSI-RS) for two-step random access procedure; and
   transmitting a request message for the two-step random access procedure, based on the set of ROs associated with CSI-RS, wherein
   the set of ROs associated with CSI-RS for two-step random access procedure is from a set of common ROs configured for two-step random access procedure,
   the set of common ROs configured for two-step random access procedure is shared with four-step random access procedure, and
   the set of ROs associated with CSI-RS for two-step random access procedure is from a set of common ROs configured for four-step random access procedure.

3. The method of claim 2, wherein the set of ROs associated with CSI-RS for two-step random access procedure is configured by one or more of following parameters:
   PRACH configuration index for defining the set of common ROs for four-step random access procedure;
   a number of PRACH transmission occasions frequency division multiplexed in one time instance for defining the set of common ROs for four-step random access procedure; or
   an offset of the lowest PRACH transmission occasion in frequency domain with respective to physical resource block 0, PRB 0, for defining the common set of ROs for four-step random access procedure.

4. The method of claim 3, wherein
   the PRACH configuration index is provided in an information element (IE) "prach-ConfigurationIndex",
   the number of PRACH transmission occasions is provided in an IE "msg1-FDM", and
   the offset of the lowest PRACH transmission occasion is provided in an IE "msg1-FrequencyStart".

5. The method of claim 2, wherein the set of common ROs configured for two-step random access procedure is not shared with four-step random access procedure.

6. The method of claim 5, wherein the set of ROs associated with CSI-RS for two-step random access procedure is configured by one or more of following parameters:
   PRACH configuration index for defining the set of common ROs for two-step random access procedure;
   a number of PRACH transmission occasions frequency division multiplexed in one time instance for defining the set of common ROs for two-step random access procedure; or
   an offset of the lowest PRACH transmission occasion in frequency domain with respective to PRB 0 for defining the common set of ROs for two-step random access procedure.

7. The method of claim 6, wherein
   the PRACH configuration index is provided in an IE "msgA-PRACH-ConfigurationIndex",
   the number of PRACH transmission occasions is provided in an IE "msgA-RO-FDM", and
   the offset of the lowest PRACH transmission occasion is provided in an IE "msgA-RO-FDM".

8. The method of claim 2, wherein the set of ROs associated with CSI-RS for two-step random access procedure is a set of dedicated ROs separately configured for two-step random access procedure.

9. The method of claim 2, wherein
   the set of ROs associated with CSI-RS for two-step random access procedure is from a set of ROs configured for four-step random access procedure, and
   the set of ROs associated with CSI-RS for two-step random access procedure is configured by the signaling message which explicitly configures the set of ROs for four-step random access procedure.

10. The method of claim 2, wherein the two-step random access procedure is contention free random access, CFRA, procedure or is used for beam failure recovery, BFR.

11. The method of claim 2, wherein the set of ROs associated with CSI-RS for two-step random access procedure is from a set of dedicated ROs configured for two-step random access procedure.

12. The method of claim 11, wherein the set of dedicated ROs configured for two-step random access procedure is associated with synchronization signal block, SSB.

13. The method of claim 11, wherein the two-step random access procedure is CFRA procedure.

14. The method of claim 11, wherein the set of dedicated ROs configured for two-step random access procedure is configured in an IE "RACH-ConfigDedicated".

15. The method of claim 14, wherein the set of dedicated ROs configured for two-step random access procedure is configured by an IE "occasionsTwoStepRA" contained in an IE "CFRA-TwoStep".

16. A terminal device comprising:
at least one processor; and
at least one memory, the at least one memory containing instructions executable by the at least one processor, whereby the terminal device is operative to:
receive, from an access network node, a signaling message which configures a set of physical random access channel (PRACH) occasions (ROs) associated with channel state information reference signal (CSI-RS) for two-step random access procedure; and
transmit a request message for the two-step random access procedure, based on the set of ROs associated with CSI-RS, wherein
the set of ROs associated with CSI-RS for two-step random access procedure is from a set of common ROs configured for two-step random access procedure,
the set of common ROs configured for two-step random access procedure is shared with four-step random access procedure, and
the set of ROs associated with CSI-RS for two-step random access procedure is from a set of common ROs configured for four-step random access procedure.

* * * * *